(12) United States Patent
Iwamoto et al.

(10) Patent No.: US 11,371,593 B2
(45) Date of Patent: Jun. 28, 2022

(54) EXTENSION/CONTRACTION MECHANISM AND MOBILE BODY

(71) Applicant: TOYOTA JIDOSHA KABUSHIKI KAISHA, Toyota (JP)

(72) Inventors: Kunihiro Iwamoto, Nagakute (JP); Hirotaka Komura, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/221,991

(22) Filed: Apr. 5, 2021

(65) Prior Publication Data

US 2021/0341041 A1 Nov. 4, 2021

(30) Foreign Application Priority Data

Apr. 30, 2020 (JP) .............................. JP2020-080136

(51) Int. Cl.
*F16H 19/06* (2006.01)
*B25J 18/02* (2006.01)

(52) U.S. Cl.
CPC .......... *F16H 19/0618* (2013.01); *B25J 18/02* (2013.01); *F16H 19/0645* (2013.01)

(58) Field of Classification Search
CPC ............. F16H 19/0618; F16H 19/0663; F16H 19/0654; F16H 19/064; F16H 19/0645; F16H 2019/0667; F16H 2019/0677; B25J 18/02; B25J 18/04
See application file for complete search history.

(56) References Cited

U.S. PATENT DOCUMENTS

| | | | | |
|---|---|---|---|---|
| 2,130,993 | A * | 9/1938 | Dubiller | F16H 19/064 343/900 |
| 3,243,132 | A * | 3/1966 | Henry | H01Q 1/087 242/390.3 |
| 3,360,894 | A * | 1/1968 | Orr | F16H 19/064 24/20 R |
| 4,819,495 | A * | 4/1989 | Hormann | B66F 3/06 74/424.6 |

(Continued)

FOREIGN PATENT DOCUMENTS

JP 4607772 B2 1/2011

*Primary Examiner* — William Kelleher
*Assistant Examiner* — Gregory T Prather
(74) *Attorney, Agent, or Firm* — Oliff PLC

(57) ABSTRACT

An extension/contraction mechanism capable of preventing a swing of an extension/contraction part when it is extended or contracted is provided. An extension/contraction mechanism according to one aspect of the present disclosure is an extension/contraction mechanism including a telescopic extension/contraction part and a base part that supports the extension/contraction part so that it can be extended/contracted, in which the extension/contraction mechanism includes a support part that contacts an inner peripheral surface or an outer peripheral surface of the extension/contraction part in order to prevent a wobble in a root part of the extension/contraction part with respect to the base part, and the support part is provided on a side surface of the base part that is opposed to the inner peripheral surface or the outer peripheral surface of the extension/contraction part that the support part contacts.

11 Claims, 15 Drawing Sheets

(56) References Cited

U.S. PATENT DOCUMENTS

| | | | | |
|---|---|---|---|---|
| 4,991,784 | A * | 2/1991 | Schmid | B64G 9/00 |
| | | | | 242/390.3 |
| 5,765,320 | A * | 6/1998 | Hamy | B25J 9/104 |
| | | | | 52/108 |
| 7,213,796 | B2 * | 5/2007 | Laforest | B66F 11/00 |
| | | | | 254/89 R |
| 10,050,342 | B1 * | 8/2018 | Hall | F16H 19/0618 |
| 2006/0272728 | A1 * | 12/2006 | Langeland | F16L 9/22 |
| | | | | 138/158 |
| 2011/0126650 | A1 * | 6/2011 | Sorensen | F16G 13/20 |
| | | | | 74/89 |
| 2017/0225327 | A1 * | 8/2017 | Yoon | B25J 9/126 |
| 2017/0291310 | A1 * | 10/2017 | Yoon | B25J 17/00 |
| 2017/0361470 | A1 * | 12/2017 | Otero Del Real | B25J 19/023 |
| 2019/0030734 | A1 * | 1/2019 | Yoon | F16H 19/0636 |
| 2019/0145498 | A1 * | 5/2019 | Yoon | F16H 19/0636 |
| | | | | 74/490.04 |

\* cited by examiner

EXTENSION/CONTRACTION MECHANISM AND MOBILE BODY

CROSS REFERENCE TO RELATED APPLICATIONS

This application is based upon and claims the benefit of priority from Japanese patent application No. 2020-80136, filed on Apr. 30, 2020, the disclosure of which is incorporated herein in its entirety by reference.

BACKGROUND

The present disclosure relates to an extension/contraction mechanism and a mobile body, and relates to, for example, an extension/contraction mechanism and a mobile body including a telescopic extension/contraction part and a base part that supports this extension/contraction part so that it can be extended/contracted.

It is possible to elongate the length of a telescopic extension/contraction mechanism when it is in an extending state despite its compact size. For example, an extension/contraction mechanism disclosed in Japanese Patent No. 4607772 includes an extension/contraction part including a first belt provided with engagement pins along a long side thereof and a second belt provided with engagement holes along a long side thereof, and a base part that supports the extension/contraction part and a cylindrical body in which grooves having a spiral shape are formed on an outer peripheral surface thereof.

In the above extension/contraction mechanism, when the engagement pins are inserted into and engaged with the engagement holes in a state in which the first belt and the second belt are offset from each other, the engagement pins are inserted into the grooves of the cylindrical body, and the cylindrical body is rotated in one direction, the first belt and the second belt are drawn out and the extension/contraction part is extended while the first belt and the second belt are wound in a spiral shape. On the other hand, when the cylindrical body is rotated in the other direction, the first belt and the second belt are drawn in and the extension/contraction part is contracted while the state in which the first belt and the second belt are wound is loosened.

SUMMARY

The applicant has found the following problem. In the extension/contraction mechanism disclosed in Japanese Patent No. 4607772, when the extension/contraction part is extended or contracted, it is possible that the extension/contraction part may swing with respect to the base part.

The present disclosure has been made in view of the above problem and provides an extension/contraction mechanism and a mobile body capable of preventing a swing of an extension/contraction part when the extension/contraction part is extended or contracted.

An extension/contraction mechanism according to one aspect of the present disclosure is an extension/contraction mechanism including a telescopic extension/contraction part and a base part that supports the extension/contraction part so that it can be extended/contracted, in which the extension/contraction mechanism includes a support part that contacts an inner peripheral surface or an outer peripheral surface of the extension/contraction part in order to prevent a wobble in a root part of the extension/contraction part with respect to the base part, and the support part is provided on a side surface of the base part that is opposed to the inner peripheral surface or the outer peripheral surface of the extension/contraction part that the support part contacts.

According to the above structure, the support part contacts the root part (i.e., the lower part) of the extension/contraction part, whereby it is possible to prevent the swing of the extension/contraction part.

In the above extension/contraction mechanism, the support part may include:
a first roller unit that contacts the inner peripheral surface of the extension/contraction part; and
a second roller unit that contacts the outer peripheral surface of the extension/contraction part.

In the above extension/contraction mechanism, rollers of the first roller unit and rollers of the second roller unit may be aligned so as to be opposed to each other with the extension/contraction part interposed therebetween.

In the above extension/contraction mechanism, the rollers of the first roller unit or the rollers of the second roller unit may be aligned in an extending/contracting direction of the extension/contraction part.

In the above extension/contraction mechanism, the rollers of the first roller unit or the rollers of the second roller unit may be biased toward the extension/contraction part by a biasing member.

In the above extension/contraction mechanism, the extension/contraction part may include a first belt and a second belt, the first belt and the second belt may be wound in a spiral shape in a state in which they are engaged with each other in such a way that they are offset from each other, and the rollers of the first roller unit or the rollers of the second roller unit may be arranged at intervals different from pitches of gaps adjacent to each other in an extending/contracting direction of the extension/contraction part in the first belt or the second belt.

In the above extension/contraction mechanism, the extension/contraction part may include a first belt and a second belt, the first belt and the second belt may be wound in a spiral shape in a state in which they are engaged with each other in such a way that they are offset from each other, and the rollers of the first roller unit or the rollers of the second roller unit may be arranged along an inclination of the first belt or an inclination the second belt, which belts are wound in the spiral shape.

In the above extension/contraction mechanism, the rollers of the first roller unit or the rollers of the second roller unit may be arranged so as to avoid engagement pins provided along a long side of the first belt or a long side of the second belt.

A mobile body according to one aspect of the present disclosure includes the above-described extension/contraction mechanism.

According to the present disclosure, it is possible to provide an extension/contraction mechanism and a mobile body capable of preventing a swing of an extension/contraction part when the extension/contraction part is extended or contracted.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, specific embodiments to which the present disclosure is applied will be described in detail. However, the present disclosure is not limited to the following embodiments. Further, for the sake of clarity of the description, the following descriptions and the drawings are simplified as appropriate.

First Embodiment

Figure 1:
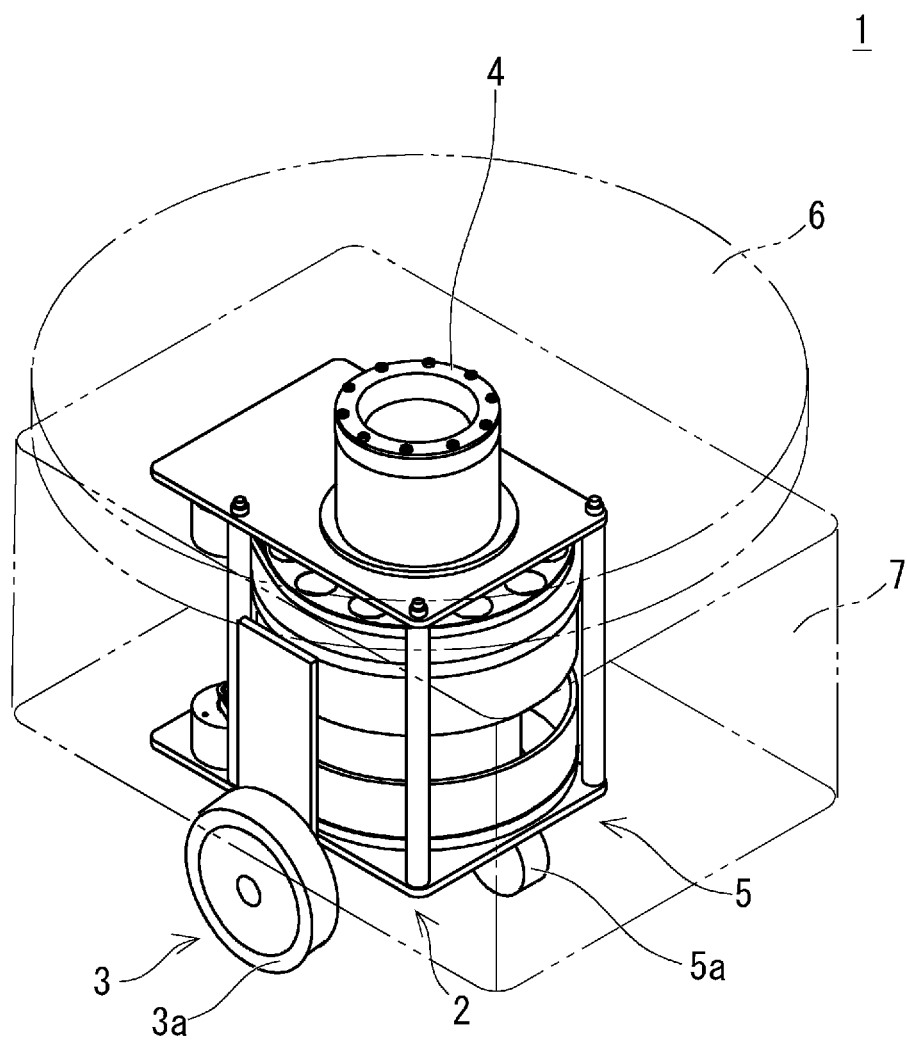
FIG. 1 is a perspective view schematically showing a mobile body according to a first embodiment.
Figure 2:
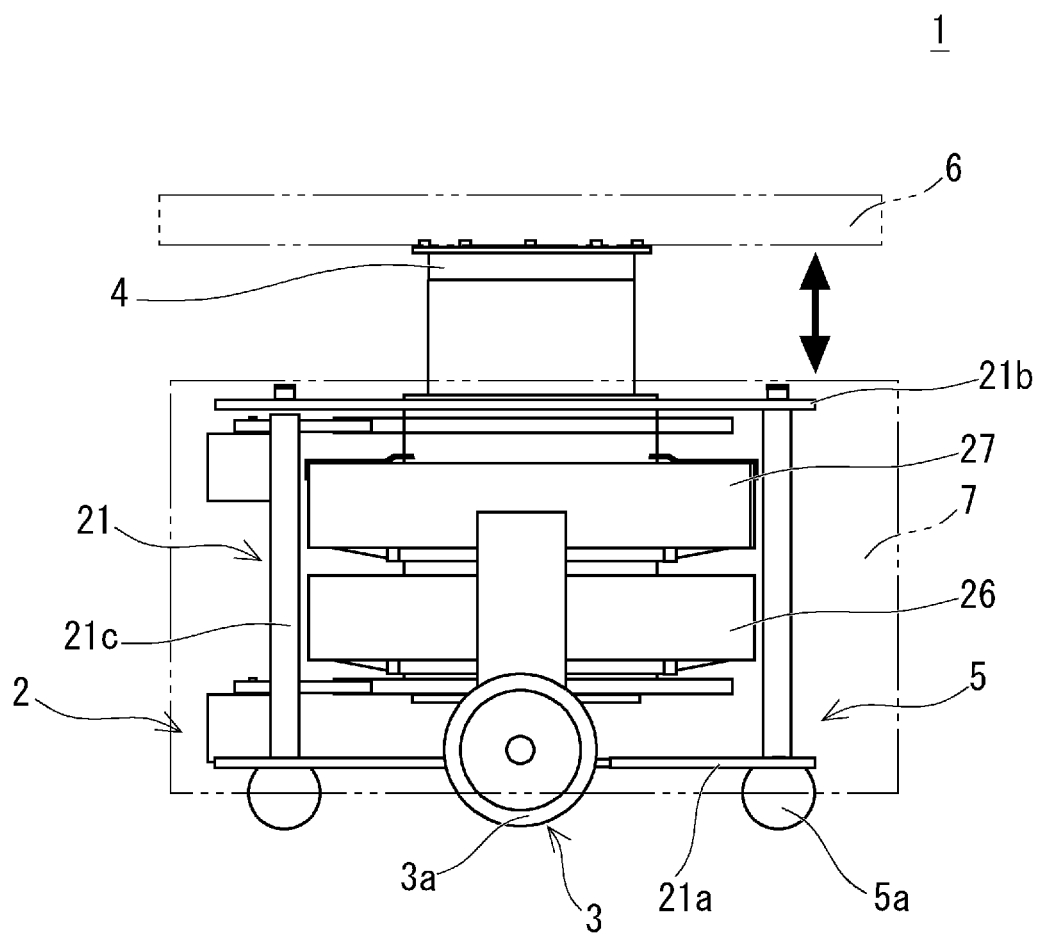
FIG. 2 is a side view schematically showing the mobile body according to the first embodiment.

First, a basic structure of a mobile body in which an extension/contraction mechanism according to this embodiment is employed will be described. FIG. 1 is a perspective view schematically showing the mobile body according to this embodiment. FIG. 2 is a side view schematically showing the mobile body according to this embodiment.

As shown in FIGS. 1 and 2, a mobile body 1 according to this embodiment includes an extension/contraction mechanism 2 and a drive part 3. The extension/contraction mechanism 2 includes an extension/contraction part 4 and a base part 5. The extension/contraction part 4 is a telescopic cylindrical body that can be extended/contracted, and a plate 6 is provided, for example, in an upper end part of the extension/contraction part 4, although the details of the extension/contraction part 4 will be described later.

The base part 5 supports the extension/contraction part 4 so that the extension/contraction part 4 can be extended/contracted, although the details of the base part 5 will be described later. Free casters 5a are provided, for example, in the front end part and the rear end part on the lower surface of the base part 5. The base part 5 may be, for example, covered with a cover 7. FIGS. 1 and 2 each indicate the plate 6 and the cover 7 by alternate long and two short dashes lines so that the structure of the mobile body 1 becomes clear.

The drive part 3 includes right and left drive wheels 3a, a motor (not shown) and the like. The right and left drive wheels 3a, the motor and the like are supported by the base part 5. This mobile body 1 travels forward, backward, or turns by rotationally driving, for example, the right and left drive wheels 3a separately from each other. Then the extension/contraction part 4 is extended or contracted in the vertical direction, whereby the plate 6 is displaced in the vertical direction. The mobile body 1 may be operated either by autonomous control or by an external instruction.

Figure 3:
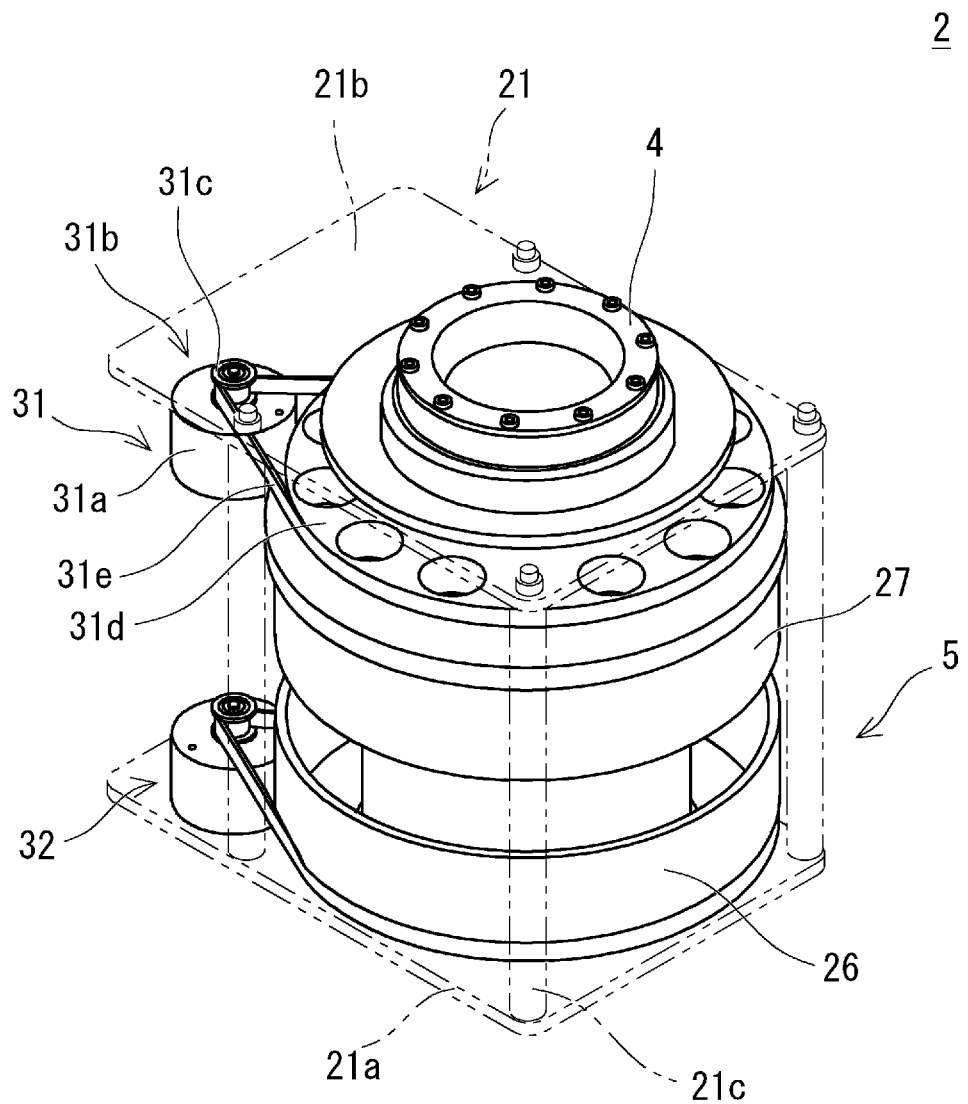
FIG. 3 is a perspective view showing an extension/contraction mechanism according to the first embodiment.
Figure 4:
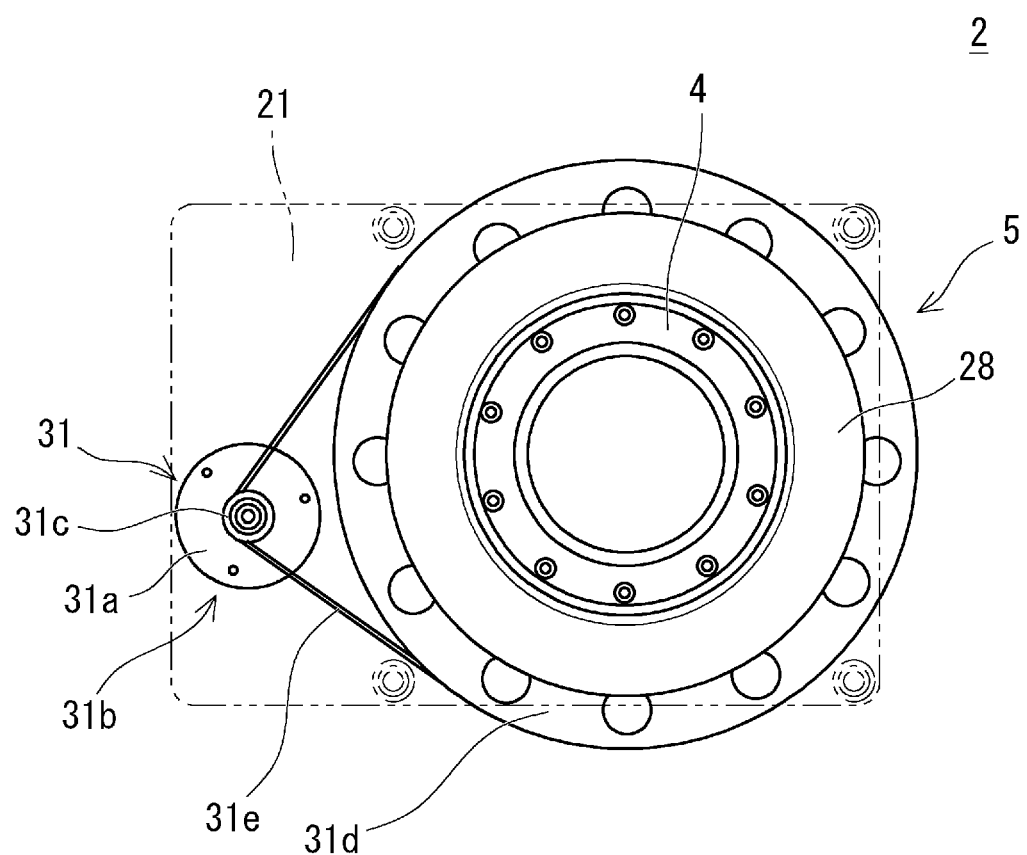
FIG. 4 is a plan view showing the extension/contraction mechanism according to the first embodiment.
Figure 5:
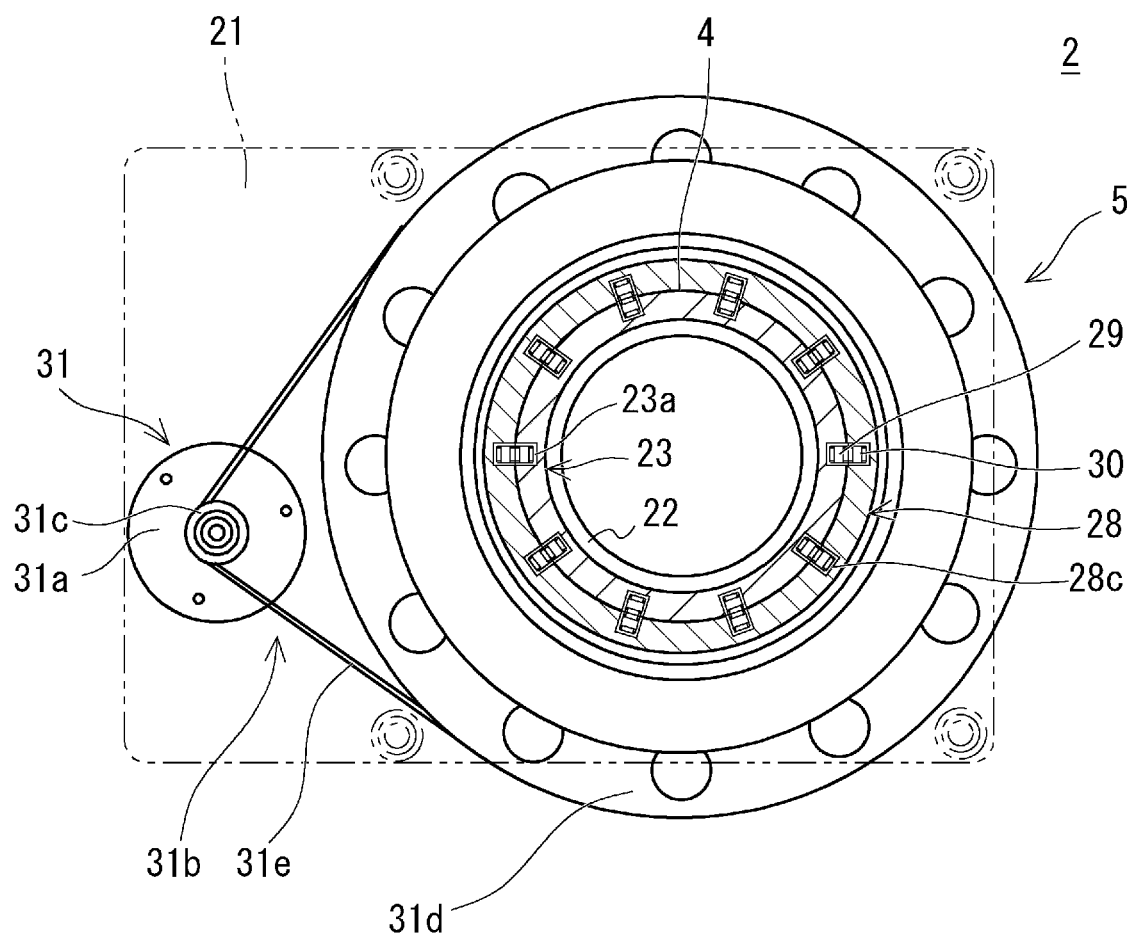
FIG. 5 is a horizontal cross-sectional view showing the extension/contraction mechanism according to the first embodiment.
Figure 6:
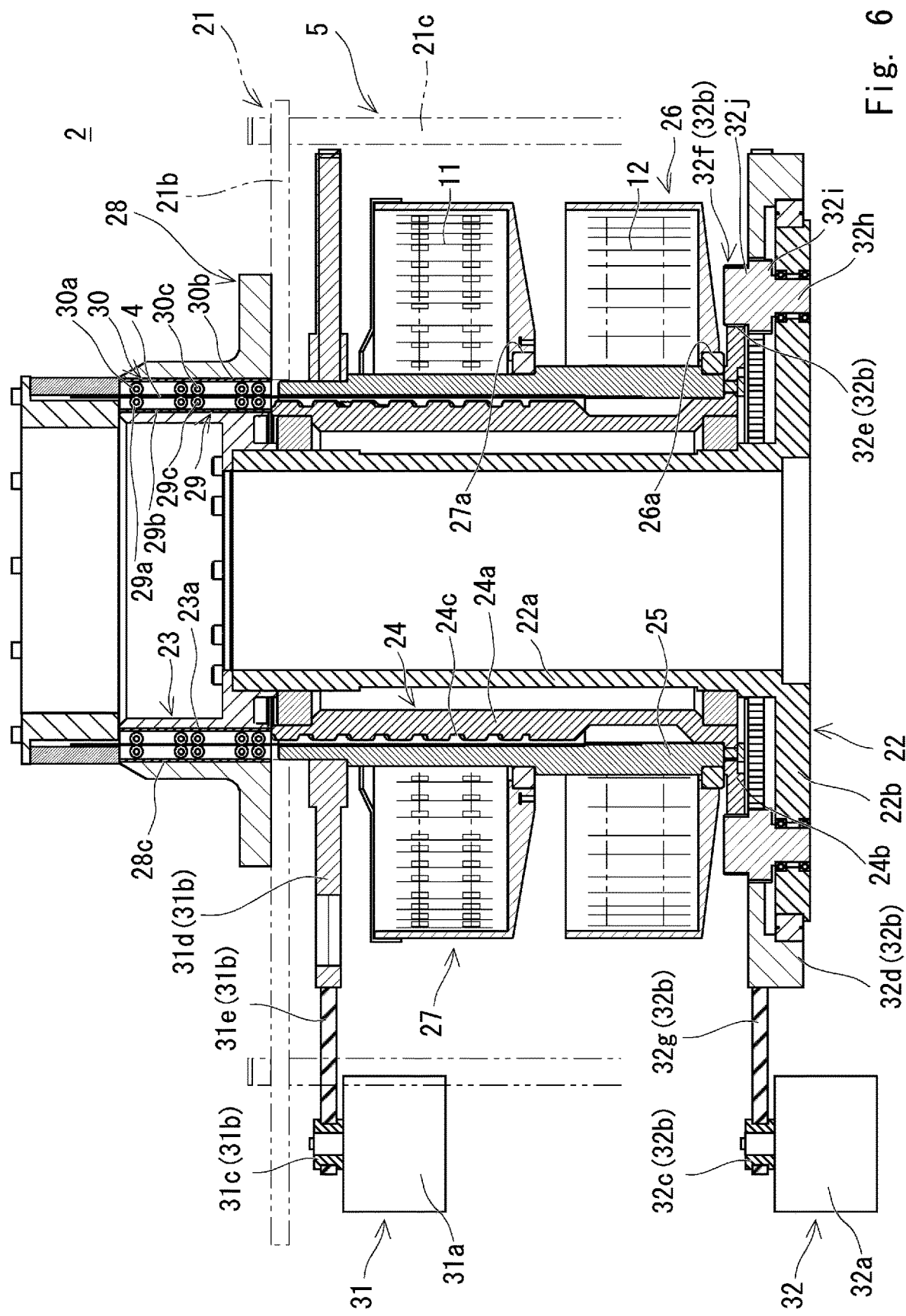
FIG. 6 is a vertical cross-sectional view showing the extension/contraction mechanism according to the first embodiment.
Figure 7:
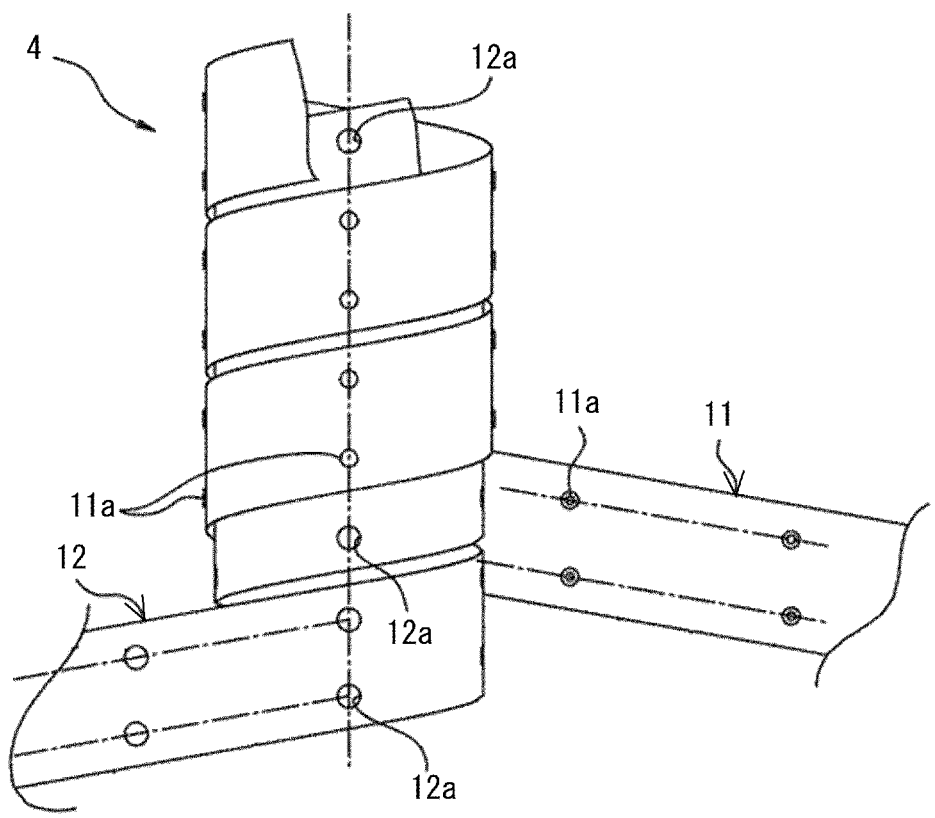
FIG. 7 is a diagram for describing the extension/contraction part according to the first embodiment.
Figure 8:
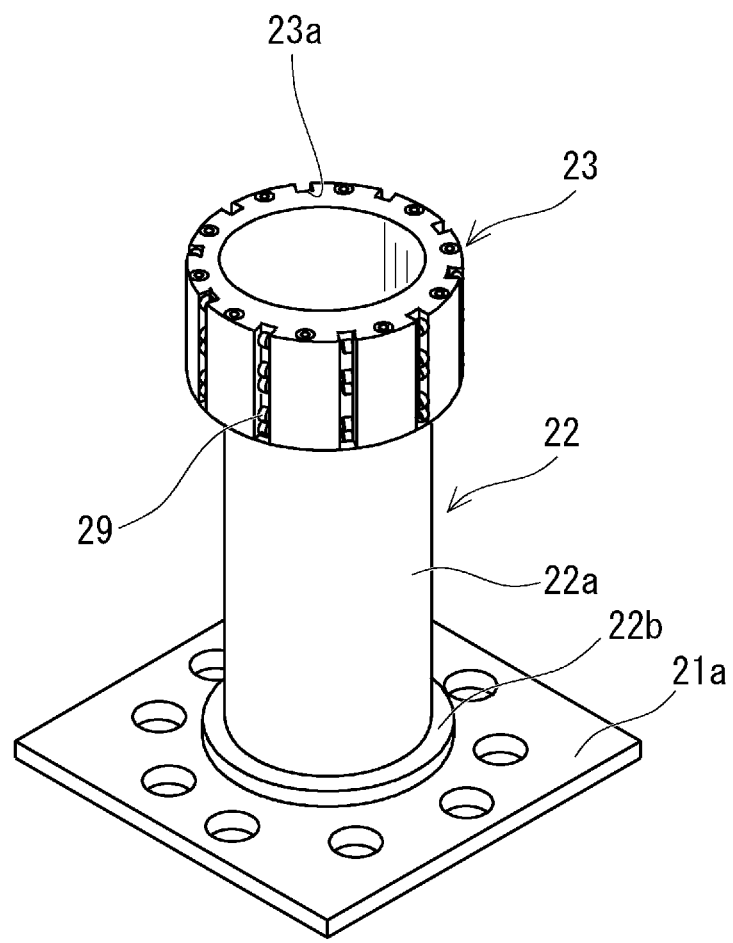
FIG. 8 is a perspective view showing a main shaft of the extension/contraction mechanism according to the first embodiment.
Figure 9:
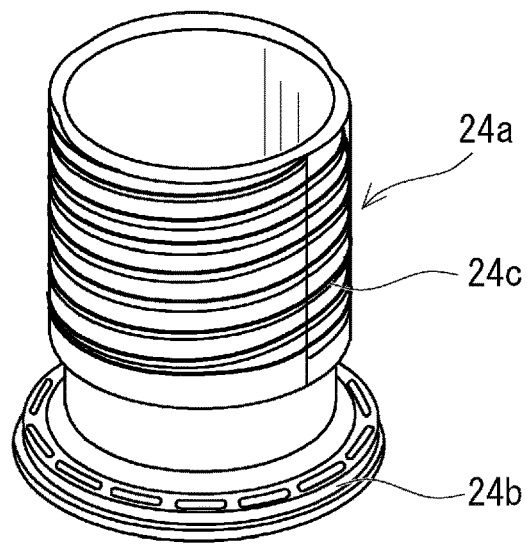
FIG. 9 is a perspective view showing a screw shaft of the extension/contraction mechanism according to the first embodiment.
Figure 10:
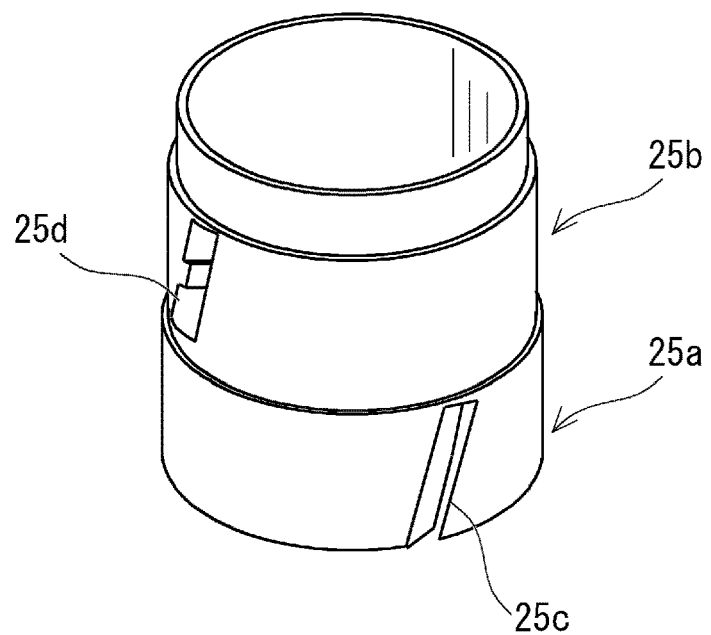
FIG. 10 is a perspective view showing a belt guide of the extension/contraction mechanism according to the first embodiment.
Figure 11:
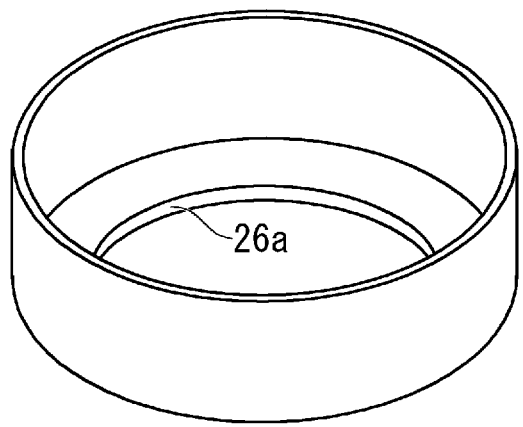
FIG. 11 is a perspective view showing a first belt holder of the extension/contraction mechanism according to the first embodiment.
Figure 12:
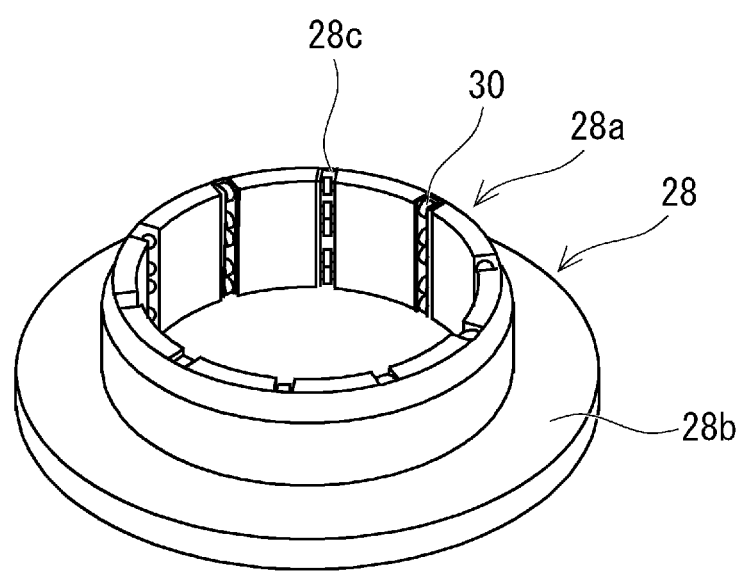
FIG. 12 is a perspective view showing a first roller holding part of the extension/contraction mechanism according to the first embodiment.
Figure 13:
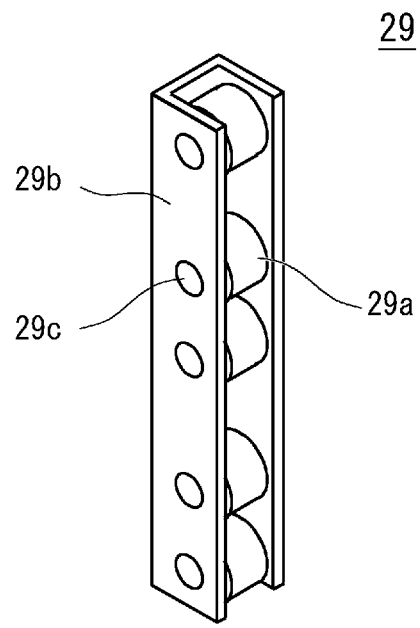
FIG. 13 is a perspective view showing a roller unit of the extension/contraction mechanism according to the first embodiment.

Next, a structure of the extension/contraction mechanism 2 according to this embodiment will be described in detail. FIG. 3 is a perspective view showing the extension/contraction mechanism according to this embodiment. FIG. 4 is a plan view showing the extension/contraction mechanism according to this embodiment. FIG. 5 is a horizontal cross-sectional view showing the extension/contraction mechanism according to this embodiment. FIG. 6 is a vertical cross-sectional view showing the extension/contraction mechanism according to this embodiment. FIG. 7 is a diagram for describing the extension/contraction part according to this embodiment. FIG. 8 is a perspective view showing a main shaft and the like of the extension/contraction mechanism according to this embodiment. FIG. 9 is a perspective view showing a screw shaft of the extension/contraction mechanism according to this embodiment. FIG. 10 is a perspective view showing a belt guide of the extension/contraction mechanism according to this embodiment. FIG. 11 is a perspective view showing a first belt holder of the extension/contraction mechanism according to this embodiment. FIG. 12 is a perspective view showing a first roller holding part of the extension/contraction mechanism according to this embodiment. FIG. 13 is a perspective view showing a roller unit of the extension/contraction mechanism according to this embodiment.

As described above, the extension/contraction mechanism 2 according to this embodiment includes the extension/contraction part 4 and the base part 5, as shown in FIGS. 3 to 6. As shown in FIG. 7, the extension/contraction part 4 includes a first belt 11 and a second belt 12. The first belt 11, which is, for example, a strip-shaped body made of steel, is provided with engagement pins 11a at substantially equal intervals along opposing long sides of the first belt 11. The second belt 12, which is, for example, a strip-shaped body made of steel having a thickness that is equal to that of the first belt 11, is provided with engagement holes 12a in such a way that the engagement holes 12a correspond to the pitches of the engagement pins 11a along the opposing long sides of the second belt 12.

The second belt 12 is arranged inside the first belt 11 in advance, and the first belt 11 and the second belt 12 are wound in a spiral shape in such a way that they are offset from each other, thereby forming the extension/contraction part 4. At this time, the engagement pins 11a of the first belt 11 are protruded toward the inside of the extension/contraction part 4, the engagement pins 11a on the upper side of the first belt 11 are engaged with the engagement holes 12a on the lower side of the second belt 12 arranged to be shifted upward with respect to the first belt 11 and the engagement pins 11a on the lower side of the first belt 11 are engaged with the engagement holes 12a on the upper side of the second belt 12 arranged to be shifted downward with respect to the first belt 11.

As shown in FIGS. 3 to 6, the base part 5 includes a frame 21, a main shaft 22, a first roller holding part 23, a screw shaft 24, a belt guide 25, a first belt holder 26, a second belt holder 27, a second roller holding part 28, a first roller unit 29, a second roller unit 30, a first drive part 31, and a second drive part 32. FIGS. 3 to 6 each show the frame 21 by an alternate long and two short dashes line so that the structure of the extension/contraction mechanism 2 becomes clear.

As shown in FIG. 3, the frame 21 includes a first plate 21a, a second plate 21b, and struts 21c. The first plate 21a is a plate-shaped body having a substantially flat upper surface. The second plate 21b, which is a plate-shaped body having a substantially flat upper surface, is arranged above the first plate 21a. A through-hole is formed in the second plate 21b. The struts 21c, which are provided in edge parts of the first plate 21a, couple the first plate 21a with the second plate 21b.

As shown in FIG. 8, the main shaft 22 includes a cylindrical part 22a and a flange part 22b that is protruded outward from the lower end part of the cylindrical part 22a and the lower end part of the main shaft 22 is rotatably supported by the first plate 21a. As shown in FIG. 6, the upper end part of the cylindrical part 22a in this main shaft 22 is protruded upward from the second plate 21b in a state in which it is made to pass through the through-hole of the second plate 21b in the frame 21.

As shown in FIG. 8, the first roller holding part 23 is a cylindrical body, and groove parts 23a that are extended in the vertical direction are formed on the outer peripheral surface of the first roller holding part 23. The groove parts 23a are arranged, for example, at substantially equal intervals in the circumferential direction of the first roller holding part 23. This first roller holding part 23 is fixed to the upper end part of the cylindrical part 22a in the main shaft 22.

As shown in FIG. 9, the screw shaft 24 includes a cylindrical part 24a and a flange part 24b. Groove parts 24c having a spiral shape into which the engagement pins 11a of the first belt 11 are inserted are formed on the outer peripheral surface of the cylindrical part 24a. The flange part 24b is protruded outward from the lower end part of the cylindrical part 24a.

Then, as shown in FIG. 6, the cylindrical part 22a of the main shaft 22 is made to pass through the screw shaft 24, and the screw shaft 24 is arranged between the flange part 22b of the main shaft 22 and the first roller holding part 23 in a state in which the screw shaft 24 can be rotated with respect to the main shaft 22.

As shown in FIG. 10, the belt guide 25, which has a cylindrical body as its basic form, includes a first part 25a having a first outer diameter and a second part 25b that has a second outer diameter that is smaller than the first outer diameter and is arranged above the first part 25a.

An opening 25c through which the second belt 12 passes is formed in the first part 25a of the belt guide 25. An opening 25d through which the first belt 11 passes is formed in the second part 25b of the belt guide 25.

Then, as shown in FIG. 6, the cylindrical part 24a of the screw shaft 24 is passed inside the belt guide 25 and the lower end part of the belt guide 25 is fixed to the flange part 24b of the screw shaft 24.

Accordingly, the screw shaft 24 and the belt guide 25 can be rotated about the main shaft 22. At this time, a gap through which the first belt 11 overlapping the second belt 12 can pass is formed between the outer peripheral surface of the cylindrical part 24a of the screw shaft 24 and the inner peripheral surface of the belt guide 25.

The first belt holder 26 accommodates the second belt 12 which is in a state before it forms the extension/contraction part 4. As shown in FIG. 11, the first belt holder 26 has a bottomed cylindrical body as its basic form, and a through-hole 26a is formed in the bottom part of the first belt holder 26.

Then, as shown in FIG. 6, the belt guide 25 is made to pass through the through-hole 26a of the first belt holder 26 and the first belt holder 26 is supported by the flange part 24b of the screw shaft 24 in a state in which the first belt holder 26 can be rotated with respect to the belt guide 25.

The second belt holder 27 accommodates the first belt 11 which is in a state before it forms the extension/contraction part 4. The second belt holder 27 has a shape substantially equal to that of the first belt holder 26 and a through-hole 27a is formed in the bottom part of the second belt holder 27.

As shown in FIG. 6, the second belt holder 27 is arranged above the first belt holder 26. Then the belt guide 25 is made to pass through the through-hole 27a of the second belt holder 27 and the second belt holder 27 is supported by a step part between the first part 25a and the second part 25b in the belt guide 25 in a state in which the second belt holder 27 can be rotated with respect to the belt guide 25.

As shown in FIG. 12, the second roller holding part 28 includes a cylindrical part 28a and a flange part 28b. The cylindrical part 28a has an inner diameter that is larger than the outer diameter of the first roller holding part 23 and groove parts 28c that are extended in the vertical direction are formed on the inner peripheral surface of the cylindrical part 28a. The groove parts 28c are arranged, for example, at substantially equal intervals in the circumferential direction of the cylindrical part 28a. The flange part 28b is formed in such a way that it is protruded outward from the lower end part of the cylindrical part 28a.

Then, as shown in FIG. 6, the flange part 28b of the second roller holding part 28 is fixed to the second plate 21b of the frame 21 in a state in which the first roller holding part 23 is made to pass inside the second roller holding part 28. At this time, as shown in FIG. 5, the groove parts 23a of the first roller holding part 23 and the groove parts 28c of the second roller holding part 28 may be arranged so that they are substantially opposed to each other.

As shown in FIG. 13, the first roller unit 29 includes rollers 29a and a fixing tool 29b. The rollers 29a, which can be rotated about a rotation shaft 29c that is extended in the substantially horizontal direction, are aligned in the vertical direction.

The fixing tool 29b, which is formed in a substantially C-shape when it is seen from the vertical direction, supports the rollers 29a via the rotation shaft 29c in a state in which the rollers 29a are arranged inside the fixing tool 29b. This first roller unit 29 is fitted into the groove parts 23a of the first roller holding part 23 and is fixed therein.

While the detailed description of the second roller unit 30 is omitted since the structure thereof is the same as that of the first roller unit 29, the rollers 30a aligned in the vertical direction are fixed to the fixing tool 30b via the rotation shaft 30c in such a way that the rollers 30a can be rotated. As shown in FIG. 12, the second roller unit 30 is fitted into the groove parts 28c of the second roller holding part 28 and is fixed therein.

At this time, a gap through which the first belt 11 and the second belt 12 can pass in a state in which they overlap each other is formed between the rollers 29a of the first roller unit 29 and the rollers 30a of the second roller unit 30, and when this gap is seen from the vertical direction, it is seen that it substantially overlaps the gap between the outer peripheral surface of the cylindrical part 24a of the screw shaft 24 and the inner peripheral surface of the belt guide 25.

The rollers 29a of the first roller unit 29 and the rollers 30a of the second roller unit 30 are arranged in such a way that, when the first belt 11 and the second belt 12 pass through the gap between the rollers 29a of the first roller unit 29 and the rollers 30a of the second roller unit 30 in a state in which the first belt 11 and the second belt 12 overlap each other, the rollers 29a of the first roller unit 29 come in contact with the inner peripheral surface of the second belt 12 and the rollers 30a of the second roller unit 30 come in contact with the outer peripheral surface of the first belt 11.

As shown in FIG. 6, the first drive part 31 includes a motor 31a and a drive transmission part 31b. The motor 31a is supported by the second plate 21b of the frame 21, although the motor 31a is not specifically shown in FIG. 6. The drive transmission part 31b includes a pinion gear 31c, a pulley 31d, and a belt 31e.

The pinion gear 31c is fixed to the output shaft of the motor 31a. The pulley 31d is a ring gear having a tooth part formed on the outer peripheral surface thereof, and the inner peripheral part of the pulley 31d is fixed to the upper end part of the belt guide 25 in such a way that it can transmit a drive force. The belt 31e, which is an endless belt in which a tooth part is formed on the inner peripheral surface thereof, bridges the pinion gear 31c and the pulley 31d.

As shown in FIG. 6, the second drive part 32 includes a motor 32a and a drive transmission part 32b. The motor 32a is supported by the first plate 21a of the frame 21 although the motor 32a is not specifically shown in FIG. 6. The drive transmission part 32b includes a pinion gear 32c, a ring gear 32d, an external tooth part 32e, a planet gear 32f, and a belt 32g.

Figure 14:
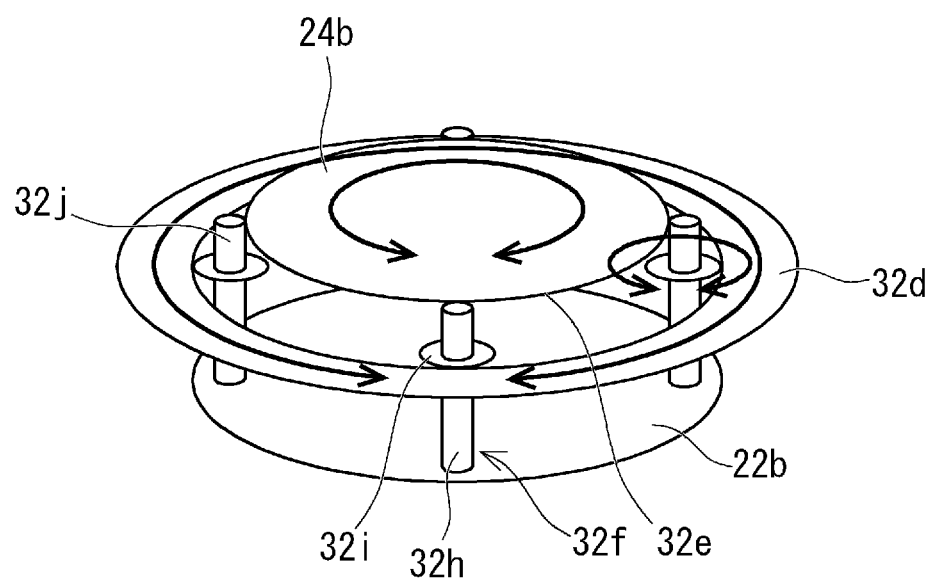
FIG. 14 is a perspective view for describing a drive transmission part of a second drive part in the extension/contraction mechanism according to the first embodiment.
Figure 15:
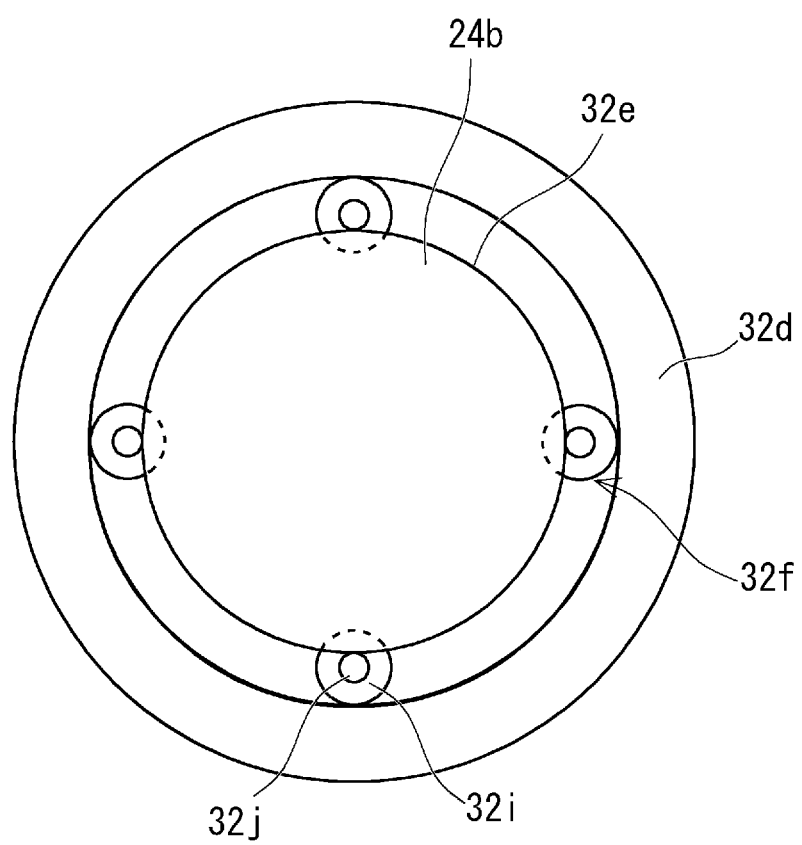
FIG. 15 is a plan view for describing the drive transmission part of the second drive part in the extension/contraction mechanism according to the first embodiment.
Figure 16:
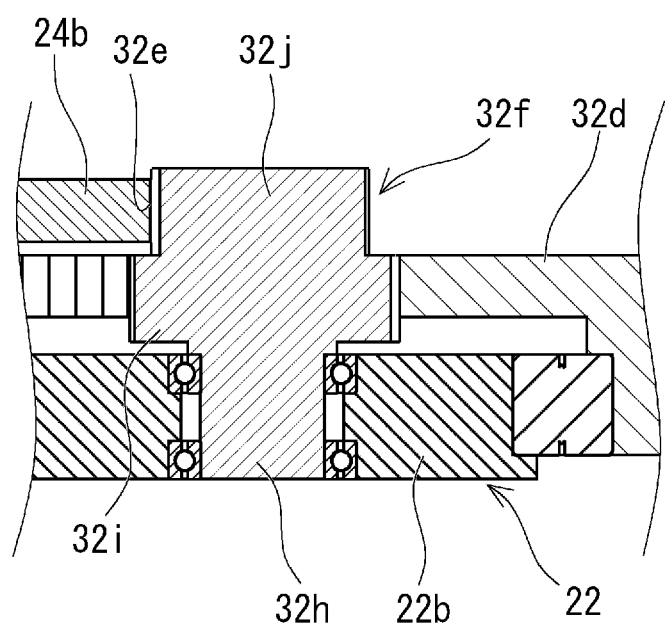
FIG. 16 is a cross-sectional view showing an area near a planet gear of the second drive part in the extension/contraction mechanism according to the first embodiment in an enlarged manner.

FIG. 14 is a perspective view for describing a drive transmission part of the second drive part in the extension/contraction mechanism according to this embodiment. FIG. 15 is a plan view for describing the drive transmission part of the second drive part in the extension/contraction mechanism according to this embodiment. FIG. 16 is a cross-sectional view showing an area near the planet gear of the second drive part in the extension/contraction mechanism according to this embodiment in an enlarged manner.

As shown in FIG. 6, the pinion gear 32c is fixed to the output shaft of the motor 32a. As shown in FIGS. 6 and 16, the ring gear 32d is rotatably supported by the flange part 22b of the main shaft 22 and a tooth part is formed on each of the outer peripheral surface and the inner peripheral surface of the ring gear 32d. The external tooth part 32e is formed on the outer peripheral surface of the flange part 24b of the screw shaft 24.

As FIGS. 14 and 16, the planet gear 32f includes a rotation shaft 32h, a first gear part 32i, and a second gear part 32j. The rotation shaft 32h is extended in the vertical direction, and the lower end part of the rotation shaft 32h is rotatably supported by the flange part 22b of the main shaft 22. As shown in FIGS. 14 to 16, the first gear part 32i, which is a gear provided in the rotation shaft 32h, is engaged with the tooth part formed on the inner peripheral surface of the ring gear 32d.

As shown in FIGS. 14 and 16, the second gear part 32j, which is a gear provided in the rotation shaft 32h, is engaged with the external tooth part 32e formed in the flange part 24b of the screw shaft 24. In this case, while the second gear part 32j is arranged above the first gear part 32i in FIGS. 14 and 16, the second gear part 32j may be arranged below the first gear part 32i.

In the first drive part 31 and the second drive part 32 described above, when the rotational speed transmitted to the screw shaft 24 to rotate the screw shaft 24 by the first drive part 31 is equal to the rotational speed transmitted to the screw shaft 24 to rotate the screw shaft 24 by the second drive part 32, the extension/contraction part 4 turns via the main shaft 22. When the above rotational speeds are different from each other, the extension/contraction part 4 is extended or contracted.

In other words, when the rotational speed of the screw shaft 24 for rotating the screw shaft 24 by the first drive part 31 is equal to the rotational speed of the screw shaft 24 for rotating the screw shaft 24 by the second drive part 32, the extension/contraction part 4 turns via the main shaft 22. When the above rotational speeds are different from each other, the extension/contraction part 4 is extended or contracted. The "rotational speed" is indicated by "+" and "−", in which "+" indicates the rotation of the screw shaft 24 in one direction and "−" indicates the rotation of the screw shaft 24 in the other direction when the mobile body 1 is seen from above.

In this case, the first drive part 31 and the second drive part 32 may satisfy, for example, the following condition. Since the extending/contracting motion of the extension/contraction part 4 is the difference between the amount of rotation of the main shaft 22 and that of the screw shaft 24, it can be expressed by the following <Expression 1>.

$$v_p = p(\omega_s - \omega_m) \qquad \text{<Expression 1>}$$

The symbol $v_p$ denotes the extension/contraction speed of the extension/contraction part 4, p denotes a pitch length of the groove parts 24c of the screw shaft 24, $\omega_s$ denotes the rotational speed of the screw shaft 24, and $\omega_m$ denotes the rotational speed of the main shaft 22.

At this time, since the rotational speed $\omega_p$ of the frame 21 with respect to the main shaft 22 matches the rotational speed of the main shaft 22, it can be expressed by the following <Expression 2>.

$$\omega_p = \omega_m \qquad \text{<Expression 2>}$$

From the relation of the planet gear 32f, the following <Expression 3> is satisfied.

$$\begin{cases} \omega_S = \omega_m - \dfrac{Z_1}{Z_s}\omega_y \\ \omega_i = \omega_m - \dfrac{Z_2}{Z_i}\omega_y \end{cases} \qquad \text{⟨Expression 3⟩}$$

The symbol $Z_1$ denotes the number of teeth of the second gear part 32j of the planet gear 32f, $Z_s$ denotes the number of teeth of the external tooth part 32e formed in the flange part 24b of the screw shaft 24, $\omega_y$ denotes the rotating speed of the planet gear 32f, $\omega_i$ denotes the rotational speed of the ring gear 32d, $Z_2$ denotes the number of teeth of the first gear part $32i$ of the planet gear $32f$, and $Z_i$ denotes the number of teeth of the tooth part formed on the inner peripheral surface of the ring gear $32d$.

In this case, it is assumed that <Expression 4> is satisfied.

$$\frac{Z_1}{Z_S} = \frac{Z_2}{Z_i} \qquad \text{<Expression 4>}$$

From the above discussion, <Expression 5> can be derived by deleting $\omega_y$.

$$\begin{cases} v_p = \dfrac{p}{2}(\omega_s - \omega_i) \\ \omega_p = \dfrac{1}{2}(\omega_s + \omega_i) \end{cases} \qquad \text{<Expression 5>}$$

Therefore, when <Expression 6> is satisfied, <Expression 7> can be derived.

$$J = \frac{1}{2}\begin{pmatrix} p & -p \\ 1 & 1 \end{pmatrix} \qquad \text{<Expression 6>}$$

$$\begin{pmatrix} v_p \\ \omega_p \end{pmatrix} = J\begin{pmatrix} \omega_S \\ \omega_i \end{pmatrix} \qquad \text{<Expression 7>}$$

By using an inverse matrix, <Expression 8> may be satisfied.

$$\begin{pmatrix} \omega_S \\ \omega_i \end{pmatrix} = J^{-1}\begin{pmatrix} v_p \\ \omega_p \end{pmatrix} = \frac{1}{p}\begin{pmatrix} 1 & p \\ -1 & p \end{pmatrix}\begin{pmatrix} v_p \\ \omega_p \end{pmatrix} \qquad \text{<Expression 8>}$$

Further, from a static relationship, <Expression 9> may be satisfied.

$$\begin{pmatrix} \tau_s \\ \tau_i \end{pmatrix} = J^T\begin{pmatrix} F_p \\ T_p \end{pmatrix} = \frac{1}{2}\begin{pmatrix} p & 1 \\ -p & 1 \end{pmatrix}\begin{pmatrix} F_p \\ T_p \end{pmatrix} \qquad \text{<Expression 9>}$$

The symbol $\tau_s$ denotes torque input to the screw shaft 24, $\tau_i$ denotes torque input to the ring gear $32d$, $F_p$ denotes an extension/contraction force of the extension/contraction part 4, and $T_p$ denotes output torque of the frame 21 with respect to the main shaft 22.

When the extension/contraction part 4 performs only the extending/contracting motion, if the following conditions <Expression 10> and <Expression 11> are satisfied, then <Expression 12> and <Expression 13> may be satisfied.

$$\begin{pmatrix} F_p \\ T_p \end{pmatrix} = \begin{pmatrix} 1 \\ 0 \end{pmatrix} \qquad \text{<Expression 10>}$$

$$\begin{pmatrix} v_p \\ \omega_p \end{pmatrix} = \begin{pmatrix} 1 \\ 0 \end{pmatrix} \qquad \text{<Expression 11>}$$

$$\begin{pmatrix} \tau_s \\ \tau_i \end{pmatrix} = \frac{1}{2}\begin{pmatrix} p \\ -p \end{pmatrix} \qquad \text{<Expression 12>}$$

$$\begin{pmatrix} \omega_s \\ \omega_i \end{pmatrix} = \frac{1}{p}\begin{pmatrix} 1 \\ -1 \end{pmatrix} \qquad \text{<Expression 13>}$$

On the other hand, when the extension/contraction part 4 performs only the turning motion, if the following conditions <Expression 14> and <Expression 15> are satisfied, then <Expression 16> and <Expression 17> may be satisfied.

$$\begin{pmatrix} F_p \\ T_p \end{pmatrix} = \begin{pmatrix} 0 \\ 1 \end{pmatrix} \qquad \text{<Expression 14>}$$

$$\begin{pmatrix} v_p \\ \omega_p \end{pmatrix} = \begin{pmatrix} 0 \\ 1 \end{pmatrix} \qquad \text{<Expression 15>}$$

$$\begin{pmatrix} \tau_s \\ \tau_i \end{pmatrix} = \frac{1}{2}\begin{pmatrix} 1 \\ 1 \end{pmatrix} \qquad \text{<Expression 16>}$$

$$\begin{pmatrix} \omega_s \\ \omega_i \end{pmatrix} = \frac{1}{p}\begin{pmatrix} p \\ p \end{pmatrix} \qquad \text{<Expression 17>}$$

Therefore, in both the extending/contracting motion and the turning motion of the extension/contraction part 4, the output of the motor $31a$ of the first drive part 31 and the output of the motor $32a$ of the second drive part 32 can be combined with each other.

Since <Expression 4>, which is assumed above, is to obtain the above relation when equivalent outputs can be obtained from the motor $31a$ of the first drive part 31 and the motor $32a$ of the second drive part 32, if, for example, the output of the motor $31a$ of the first drive part 31 is different from the output of the motor $32a$ of the second drive part 32, <Expression 4> may not necessarily be satisfied.

Next, operations when the extension/contraction part 4 of the extension/contraction mechanism 2 according to this embodiment is extended or contracted will be described. The motor $31a$ of the first drive part 31 and the motor $32a$ of the second drive part 32 are rotationally driven in such a way that the rotational speed transmitted to the screw shaft 24 to rotate the screw shaft 24 by the first drive part 31 becomes different from the rotational speed transmitted to the screw shaft 24 to rotate the screw shaft 24 by the second drive part 32, the rotational drive force of the motor $31a$ is transmitted to the screw shaft 24 via the drive transmission part $31b$ of the first drive part 31 and the belt guide 25, and the rotational drive force of the motor $32a$ is transmitted to the main shaft 22 and the screw shaft 24 via the drive transmission part $32b$ of the second drive part 32.

Accordingly, the screw shaft 24 is differentially rotated with respect to the main shaft 22, and this rotation of the screw shaft 24 causes the extension/contraction part 4 to be extended while the first belt 11 and the second belt 12 are drawn and wound in a spiral shape or causes the extension/contraction part 4 to be contracted while the state in which the first belt 11 and the second belt 12 are engaged with each other and wound is loosened.

At this time, in the mobile body 1 and the extension/contraction mechanism 2 according to this embodiment, the lower part of the extension/contraction part 4 is held by the rollers $29a$ of the first roller unit 29 and the rollers $30a$ of the second roller unit 30 in the thickness direction of the extension/contraction part 4, whereby it is possible to prevent a swing of the extension/contraction part 4.

Next, operations when the extension/contraction part 4 of the extension/contraction mechanism 2 according to this embodiment turns will be described. The motor 31*a* of the first drive part 31 and the motor 32*a* of the second drive part 32 are rotationally driven in such a way that the rotational speed transmitted to the screw shaft 24 to rotate the screw shaft 24 by the first drive part 31 becomes equal to the rotational speed transmitted to the screw shaft 24 to rotate the screw shaft 24 by the second drive part 32, thereby transmitting the rotational drive force of the motor 31*a* to the screw shaft 24 via the drive transmission part 31*b* of the first drive part 31 and the belt guide 25 and transmitting the rotational drive force of the motor 32*a* to the main shaft 22 and the screw shaft 24 via the drive transmission part 32*b* of the second drive part 32.

Accordingly, the main shaft 22 and the screw shaft 24 are equally rotated, the main shaft 22, the screw shaft 24, the belt guide 25, and the extension/contraction part 4 are integrally rotated, as a result of which the extension/contraction part 4 turns with respect to the base part 5.

As described above, in the mobile body 1 and the extension/contraction mechanism 2 according to this embodiment, at least one of the rollers 29*a* of the first roller unit 29 and the rollers 30*a* of the second roller unit 30 contacts the lower part of the extension/contraction part 4, whereby it is possible to prevent a swing of the extension/contraction part 4. That is, the rollers 29*a* of the first roller unit 29 and the rollers 30*a* of the second roller unit 30 function as support parts for preventing a swing of the extension/contraction part 4.

In this case, the rollers 29*a* of the first roller unit 29 and the rollers 30*a* of the second roller unit 30 may be arranged so as to be opposed to each other in the thickness direction of the extension/contraction part 4. Accordingly, the lower part of the extension/contraction part 4 can be definitely held by the rollers 29*a* of the first roller unit 29 and the rollers 30*a* of the second roller unit 30.

Moreover, since the rollers 29*a* of the first roller unit 29 and the rollers 30*a* of the second roller unit 30 are aligned in the vertical direction, which is the extending/contracting direction of the extension/contraction part 4, the rollers 29*a* and 30*a* are smoothly rotated following the extension/contraction of the extension/contraction part 4 and friction caused therebetween can be reduced, whereby it is possible to suppress wear of the rollers 29*a* and 30*a*.

Further, the rollers 29*a* of the first roller unit 29 may be arranged at intervals different from pitches of the gaps adjacent to each other in the extending/contracting direction of the extension/contraction part 4 in the second belt 12. Accordingly, all the rollers 29*a* of the first roller unit 29 do not interfere with the gaps of the second belt 12 that are adjacent to each other in the extending/contracting direction of the extension/contraction part 4 and any one of the rollers 29*a* comes in contact with the second belt 12.

Likewise, the rollers 30*a* of the second roller unit 30 may be arranged at intervals different from the pitches of the gaps adjacent to each other in the extending/contracting direction of the extension/contraction part 4 in the first belt 11. Accordingly, all the rollers 30*a* of the second roller unit 30 do not interfere with the gaps of the first belt 11 adjacent to each other in the extending/contracting direction of the extension/contraction part 4 and one of the rollers 30*a* comes in contact with the first belt 11. Therefore, it is possible to further prevent a swing of the extension/contraction part 4.

Further, the rollers 29*a* of the first roller unit 29 may be arranged so as to avoid the engagement pins 11*a* of the first belt 11. It is therefore possible to make the rollers 29*a* of the first roller unit 29 definitely come in contact with the first belt 11.

Figure 17:
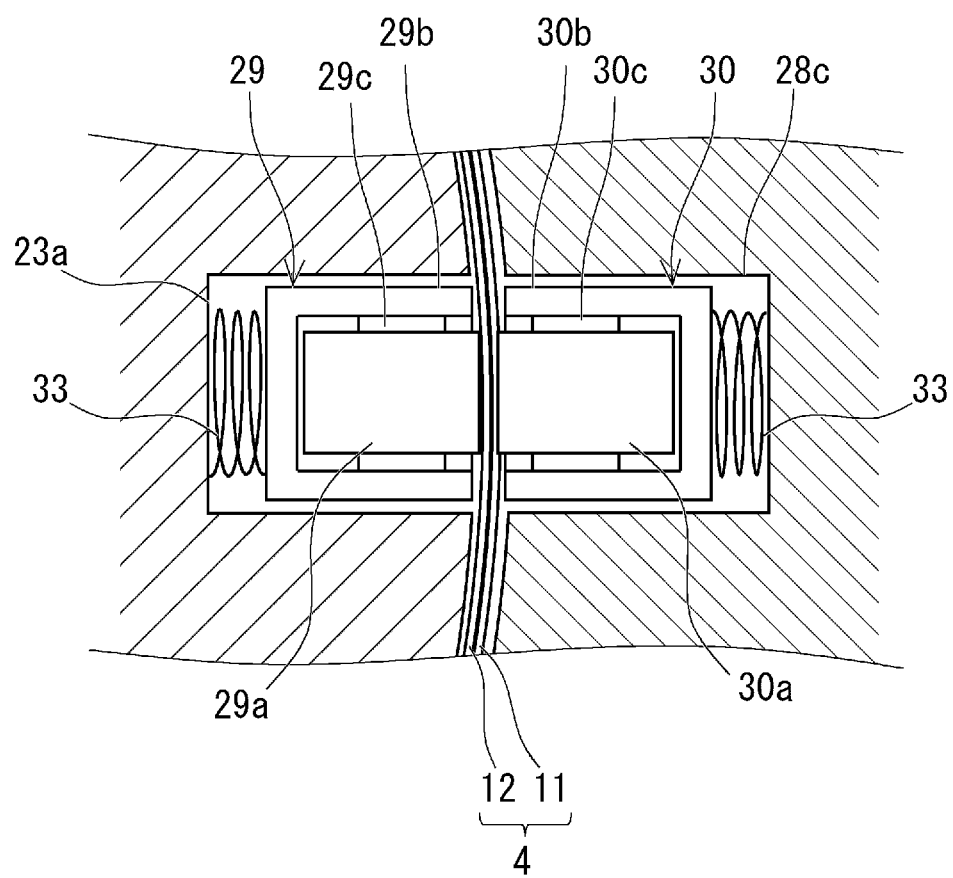
FIG. 17 is a plan view showing a preferable form of holding the extension/contraction part by the first roller unit and the second roller unit.

Incidentally, as shown in FIG. 17, at least one of the rollers 29*a* of the first roller unit 29 and the rollers 30*a* of the second roller unit 30 may be biased toward the extension/contraction part 4 by a biasing member 33 such as a spring. Accordingly, at least one of the rollers 29*a* of the first roller unit 29 and the rollers 30*a* of the second roller unit 30 can be definitely made to come in contact with the extension/contraction part 4.

Further, the mobile body 1 or the extension/contraction mechanism 2 according to this embodiment is able to achieve the extending/contracting motion and the turning motion of the extension/contraction part 4 by the first drive part 31 and the second drive part 32. In addition, the output of the motor 31*a* of the first drive part 31 and the output of the motor 32*a* of the second drive part 32 are combined with each other, whereby it is possible to achieve the extending/contracting motion and the turning motion of the extension/contraction part 4. Therefore, the size of the motors 31*a* and 32*a* can be reduced compared to that in the case in which the extending/contracting motion and the turning motion of the extension/contraction part 4 are achieved separately by outputs of respective motors using two motors, which contributes to reducing the size and the weight of the mobile body 1.

Second Embodiment

Figure 18:
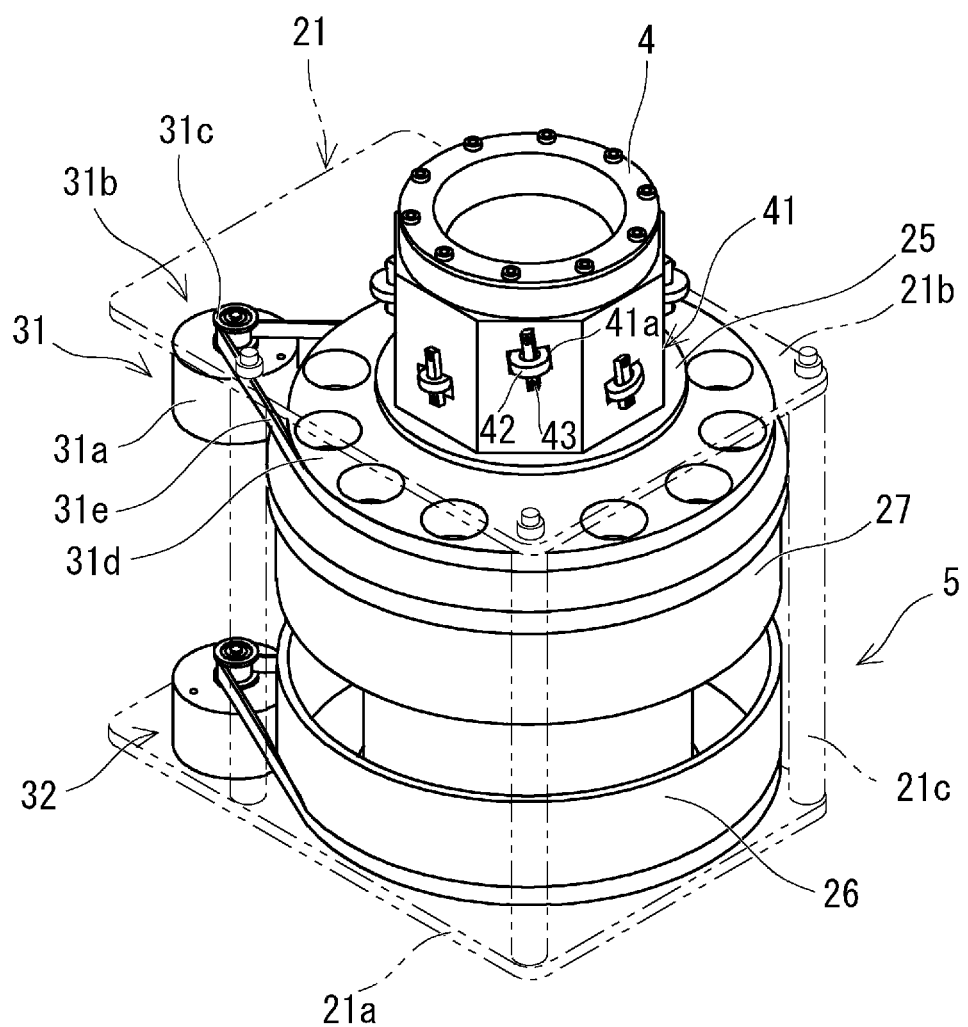
FIG. 18 is a perspective view showing an extension/contraction mechanism according to a second embodiment.

While the second roller holding part 28 is configured in such a way that it is not rotated in the extension/contraction mechanism 2 according to the first embodiment, the second roller holding part may be rotated along with the belt guide 25. FIG. 18 is a perspective view showing an extension/contraction mechanism according to this embodiment.

For example, as shown in FIG. 18, a second roller holding part 41, which is provided with rollers 42 obliquely arranged along the inclination of the first belt 11 wound in a spiral shape, is fixed to the upper end part of the belt guide 25.

The rollers 42 can be rotated about a rotation shaft 43 perpendicular to the angle of the inclination of the first belt 11 derived based on the amount of rotation of the extension/contraction part 4 and the amount of extension/contraction of the extension/contraction part 4. Then the rollers 42 are protruded from the inner peripheral surface of the second roller holding part 41 via a through-hole 41*a* formed in the second roller holding part 41.

According to the above structure, the rollers 42 always contact a constant height position of the extending/contracting direction of the extension/contraction part 4 in the first belt 11, whereby it is possible to avoid interference of the rollers 42 with the gap of the first belt 11 when the extension/contraction part 4 is extended or contracted in a simple manner.

Incidentally, the first roller holding part may also have a structure that is substantially similar to that of the second roller holding part 41 and may include rollers obliquely provided along the inclination of the second belt 12.

The present disclosure is not limited to the above embodiments and may be changed as appropriate without departing from the spirit of the present disclosure.

For example, while the extension/contraction mechanism according to the above embodiments is configured in such a way that the extension/contraction part 4 can turn, the extension/contraction part 4 may not instead turn.

For example, while the extension/contraction mechanism according to the above embodiments includes the first roller unit 29 and the second roller unit 30 in order to prevent a swing in the root part of the extension/contraction part 4, it is sufficient that it have at least a support part that contacts the inner peripheral surface or the outer peripheral surface of the root part of the extension/contraction part 4.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An extension/contraction mechanism comprising:
   a telescopic extension/contraction part having an extending/contracting portion that is a hollow cylinder having an inner peripheral surface on an inside of the hollow cylinder and an outer peripheral surface on an outside of the hollow cylinder;
   a base part that supports the extension/contraction part so that the extension/contraction part can be extended/contracted; and
   a support part that includes (i) a first roller unit that contacts the inner peripheral surface of the hollow cylinder and (ii) a second roller unit that contacts the outer peripheral surface of the hollow cylinder, in order to prevent a wobble in a root part of the extension/contraction part with respect to the base part, wherein
   the support part is provided on a side surface of the base part that is opposed to the inner peripheral surfaces and the outer peripheral surface of the extension/contraction part that the support part contacts.

2. The extension/contraction mechanism according to claim 1, wherein rollers of the first roller unit and rollers of the second roller unit are arranged so as to be opposed to each other with the extension/contraction part interposed therebetween.

3. The extension/contraction mechanism according to claim 1, wherein rollers of the first roller unit or rollers of the second roller unit are aligned in an extending/contracting direction of the extension/contraction part.

4. The extension/contraction mechanism according to claim 1, wherein rollers of the first roller unit or rollers of the second roller unit are biased toward the extension/contraction part by a biasing member.

5. The extension/contraction mechanism according to claim 1, wherein
   the extension/contraction part comprises a first belt and a second belt,
   the first belt and the second belt are wound in a spiral shape to engage portions of the first and second belts with each other so as to be offset from each other in order to extend/contract the extension/contraction part, and
   rollers of the first roller unit or rollers of the second roller unit are arranged at intervals different from pitches of gaps in the extending/contracting direction of the extension/contraction part between adjacent edges of the first belt or the second belt that have been wound in the spiral shape.

6. The extension/contraction mechanism according to claim 5, wherein the rollers of the first roller unit or the rollers of the second roller unit are arranged so as to avoid engagement pins provided along a long side of the first belt or a long side of the second belt.

7. The extension/contraction mechanism according to claim 1, wherein
   the extension/contraction part comprises a first belt and a second belt,
   the first belt and the second belt are wound in a spiral shape to engage portions of the first and second belts with each other so as to be offset from each other in order to extend/contract the extension/contraction part, and
   rollers of the first roller unit or rollers of the second roller unit are arranged along an inclination of the first belt or an inclination of the second belt that have been wound in the spiral shape.

8. A mobile body comprising the extension/contraction mechanism according to claim 1.

9. The extension/contraction mechanism according to claim 1, wherein
   the telescopic extension/contraction part includes a first belt and a second belt that are wound in a spiral shape to engage portions of the first and second belts with each other so as to be offset from each other in order to extend/contract the extension/contraction part, the portions of the first and second belts that have been wound in the spiral shape forming the hollow cylinder.

10. An extension/contraction mechanism comprising:
    a telescopic extension/contraction part;
    a base part that supports the extension/contraction part so that the extension/contraction part can be extended/contracted; and
    a support part that contacts an inner peripheral surface or an outer peripheral surface of the extension/contraction part in order to prevent a wobble in a root part of the extension/contraction part with respect to the base part, the support part including: (i) a first roller unit that contacts the inner peripheral surface of the extension/contraction part, and (ii) a second roller unit that contacts the outer peripheral surface of the extension/contraction part, wherein
    the support part is provided on a side surface of the base part that is opposed to the inner peripheral surface or the outer peripheral surface of the extension/contraction part that the support part contacts,
    the extension/contraction part comprises a first belt and a second belt,
    the first belt and the second belt are wound in a spiral shape to engage portions of the first and second belts with each other so as to be offset from each other in order to extend/contract the extension/contraction part, and
    rollers of the first roller unit or rollers of the second roller unit are arranged at intervals different from pitches of gaps in the extending/contracting direction of the extension/contraction part between adjacent edges of the first belt or the second belt that have been wound in the spiral shape.

11. An extension/contraction mechanism comprising:
    a telescopic extension/contraction part;
    a base part that supports the extension/contraction part so that the extension/contraction part can be extended/contracted; and
    a support part that contacts an inner peripheral surface or an outer peripheral surface of the extension/contraction part in order to prevent a wobble in a root part of the extension/contraction part with respect to the base part, the support part including: (i) a first roller unit that contacts the inner peripheral surface of the extension/ contraction part, and (ii) a second roller unit that contacts the outer peripheral surface of the extension/contraction part, wherein the support part is provided on a side surface of the base part that is opposed to the inner peripheral surface or the outer peripheral surface of the extension/contraction part that the support part contacts, the extension/contraction part comprises a first belt and a second belt, the first belt and the second belt are wound in a spiral shape to engage portions of the first and second belts with each other so as to be offset from each other in order to extend/contract the extension/contraction part, and rollers of the first roller unit or rollers of the second roller unit are arranged along an inclination of the first belt or an inclination of the second belt that have been wound in the spiral shape.

\* \* \* \* \*